United States Patent
Fiore

(10) Patent No.: US 12,158,540 B2
(45) Date of Patent: Dec. 3, 2024

(54) ARCHITECTURE INCLUDING A HYBRID COUPLER, A QUADRATURE DOWN-CONVERTER, AND A BASEBAND SIGNAL LINEAR COMBINER

(71) Applicant: Infineon Technologies AG, Neubiberg (DE)

(72) Inventor: Vincenzo Fiore, Linz (AT)

(73) Assignee: Infineon Technologies AG, Neubiberg (DE)

(*) Notice: Subject to any disclaimer, the term of this patent is extended or adjusted under 35 U.S.C. 154(b) by 372 days.

(21) Appl. No.: 17/550,250

(22) Filed: Dec. 14, 2021

(65) Prior Publication Data
US 2023/0184889 A1 Jun. 15, 2023

(51) Int. Cl.
*G01S 7/40* (2006.01)
*G01S 7/35* (2006.01)

(52) U.S. Cl.
CPC ............ *G01S 7/4069* (2021.05); *G01S 7/358* (2021.05)

(58) Field of Classification Search
CPC ................................ G01S 7/358; G01S 7/4069
See application file for complete search history.

(56) References Cited

U.S. PATENT DOCUMENTS

| | | | |
|---|---|---|---|
| 5,757,312 A | 5/1998 | Szmurlo et al. | |
| 6,054,948 A | 4/2000 | Dean | |
| 10,742,245 B1 * | 8/2020 | Chen | H04B 1/1027 |
| 2003/0030582 A1 | 2/2003 | Vickers | |
| 2010/0148862 A1 * | 6/2010 | Woo | H03F 1/0288 |
| | | | 330/124 R |
| 2010/0297966 A1 * | 11/2010 | Row | H03F 1/3241 |
| | | | 455/114.3 |

(Continued)

FOREIGN PATENT DOCUMENTS

| | | | | |
|---|---|---|---|---|
| CA | 2812387 A1 * | 10/2013 | ........... | H04B 1/1036 |
| CN | 1223506 A * | 7/1999 | ........... | H04L 27/367 |

(Continued)

OTHER PUBLICATIONS

Jung H, KR 20020047542 A (Year: 2002).*

(Continued)

Primary Examiner — Vladimir Magloire
Assistant Examiner — Maxine McKenzie Phillips
(74) Attorney, Agent, or Firm — Harrity & Harrity, LLP

(57) ABSTRACT

A radio frequency (RF) circuit includes a signal path coupled between two RF inputs and at least one baseband output terminal. The signal path includes a 90° hybrid coupler including a first port that receives a first RF signal and a second port that receives a second RF signal. The 90° hybrid coupler generates a first coupler output signal based on the first RF signal and the second RF signal and generates a second coupler output signal based on the first RF signal and the second RF signal. The signal path includes a quadrature down-converter configured to down-convert the first coupler output signal into a first baseband signal and down-convert the second coupler output signal into a second baseband signal. The RF circuit includes a baseband combiner circuit configured to combine the first baseband signal and the second baseband signal to generate at least one of output signal.

28 Claims, 7 Drawing Sheets

(56) References Cited

U.S. PATENT DOCUMENTS

| | | | | |
|---|---|---|---|---|
| 2011/0092174 | A1* | 4/2011 | Choi | H01Q 1/24 |
| | | | | 455/118 |
| 2017/0062897 | A1* | 3/2017 | Chance | H04B 1/52 |
| 2018/0108963 | A1* | 4/2018 | Moon | H01P 5/12 |
| 2018/0172801 | A1 | 6/2018 | Schrattenecker et al. | |
| 2020/0382170 | A1* | 12/2020 | Lang | H03M 1/12 |
| 2021/0072346 | A1* | 3/2021 | Bogner | G01S 7/354 |
| 2021/0190910 | A1* | 6/2021 | Itkin | G01S 13/343 |
| 2021/0320698 | A1* | 10/2021 | Sharafat | H04W 52/143 |

FOREIGN PATENT DOCUMENTS

| | | | | | |
|---|---|---|---|---|---|
| CN | 1242669 | A | * | 1/2000 | |
| CN | 1491045 | A | * | 4/2004 | |
| CN | 1698298 | A | * | 11/2005 | H04J 14/0298 |
| CN | 201478449 | U | * | 5/2010 | |
| CN | 101866018 | A | | 10/2010 | |
| CN | 104573772 | A | * | 4/2015 | |
| CN | 104734643 | A | * | 6/2015 | |
| CN | 105191119 | B | * | 10/2018 | H03D 3/009 |
| CN | 210628509 | U | | 5/2020 | |
| CN | 113366766 | A | * | 9/2021 | H03F 3/24 |
| EP | 1193861 | A2 | * | 4/2002 | H03F 1/3229 |
| EP | 1667321 | A1 | * | 6/2006 | H03G 3/3052 |
| EP | 3158607 | B1 | * | 10/2020 | H01P 1/165 |
| GB | 2257841 | A | * | 1/1993 | H01P 5/16 |
| GB | 2292012 | A | * | 2/1996 | G01S 7/03 |
| JP | 2004320266 | A | * | 11/2004 | |
| JP | 2004320367 | A | * | 11/2004 | H01Q 3/2605 |
| TW | 538298 | U | * | 3/2017 | |
| WO | WO-2005040846 | A1 | * | 5/2005 | G01S 11/08 |
| WO | WO-2006044372 | A2 | * | 4/2006 | H03D 3/008 |

OTHER PUBLICATIONS

Lee D, KR 20090090684 A (Year: 2009).*
Wolfgang, JP 2005504295 A (Year: 2005).*
Lee, KR 20160082361 A (Year: 2016).*
"IIP3 calculator from OIP3 calculation | IIP3 formula." RF Wireless World. RF & Wireless Vendors and Resources. Dec. 3, 2021. https://www.rfwireless-world.com/calculators/IIP3-calculator.html.
Kuo-Chang Chan. "The IP3 Specification—Demystified." Maxim Integrated Products, Inc. Mar. 12, 2013. pp. 1-16. http://www.maximintegrated.com/an5429.

* cited by examiner

ARCHITECTURE INCLUDING A HYBRID COUPLER, A QUADRATURE DOWN-CONVERTER, AND A BASEBAND SIGNAL LINEAR COMBINER

BACKGROUND

Modern radar devices such as radar range and velocity sensors can be integrated in so-called monolithic microwave integrated circuits (MMICs). Radar sensors may be applied, for example, in the automotive sector, where they are used in so-called advanced driver assistance systems (ADAS) such as, for example, "adaptive cruise control" (ACC) or "radar cruise control" systems. Such systems may be used to automatically adjust the speed of an automobile so as to maintain a safe distance from other automobiles travelling ahead. However, RF circuits are also used in many other fields such as RF communication systems.

A radar MMIC (sometimes referred to as single chip radar) may incorporate all core functions of the RF frontend of a radar transceiver (e.g., local oscillator, power amplifiers, low-noise amplifiers (LNA), mixers, etc.), the analog pre-processing of the intermediate frequency (IF) or base band signals (e.g., filters, amplifiers, etc.), and the analog-to-digital conversion in one single package. The RF frontend usually includes multiple reception and transmission channels, particularly in applications in which beam steering techniques, phased antenna arrays, etc. are used. In radar applications, phased antenna arrays may be employed to sense the incidence angle of incoming RF radar signals (also referred to as "Direction of Arrival", DOA).

Reception (RX) monitoring is an operation executed by a radar MIMIC to ensure that all units involved in reception of radar signal are working as expected and the received radar data can be trusted for use. In particular, a monitoring sub-system can be used to observe key parameters and performance or health indicators, by means of specific measurements carried out on special test signals, which can highlight faults in the system so that appropriate action can be taken in such occurrences. One common circumstance in which monitoring sub-systems can become ineffective is the presence of interference during the monitoring measurement (e.g., during injection of the monitoring signal or test signal into the receive channel). In such case, interference may impact the result of the monitoring and be treated as a fault. This may result in part or the entire system being shut down, despite the possible interference being only a temporary event.

Accordingly, one challenge is how to ensure robust monitoring for RF receivers, such as millimeter wave (mmW) receivers utilized in automotive radars, in presence of interference. Current hardware techniques implement monitoring functionalities by passive couplers (e.g., directional couplers or capacitive couplers) which simply superimpose the test signal onto the RF receive signal being received at a receiver antenna. Such architectures strongly attenuate the test signal due to power splitters, long passive distribution ines, and coupler losses without attenuating the RF receive signal. As a result, the test signal is susceptible to interference during RX monitoring phase. Additionally, the RF receive signal is corrupted by the test signal imperfections, resulting in a corrupted radar output signal if RX monitoring is performed while radar operations. In other words, RF reception cannot be performed simultaneously while RX monitoring is performed (i.e., while the test signal is active). In other words, both the RF receive signal and the test signal interfere with each other, leading to signal errors and imperfections Moreover, these interferences prevent direct noise monitoring from being implemented and may trigger false "SNR fail" errors, thus, limiting radar availability and impairing system robustness. The problem is expected to grow significantly as more and more vehicles are equipped with radar systems.

Therefore, an improved RX monitoring system capable of superimposing a test signal onto a RF receive signal on a receive channel without attenuating the test signal and/or without introducing interfering signal components on either of the test signal or the RF receive signal by the other signal may be desirable.

In other applications it may be desirable to have two different sets of physical RX antennas which differ in specific characteristics, and be able to process only one of those inputs. In other words, it is desirable to switch among two different antenna inputs. This switching operation enables to reuse a single RX RF front-end (e.g. LNA, mixer, and baseband) and therefore reduce the MIMIC cost or power consumption. Current hardware techniques require dedicated "RF switch" devices between the two antenna inputs and the RF front-end. Such RF switches may have a non-negligible cost impact on the overall radar system or strongly limit the performance of the RX signal path.

Therefore, a method or a receiver architecture able to selectively down-convert two different inputs without the need for a dedicated RF switch or two separate RF front-ends is desirable.

SUMMARY

Embodiments provide a method for and a device for reception monitoring of a receive path of a radio frequency (RF) circuit.

One or more embodiments provide an RF circuit, incudes: a first RF input configured to receive a first RF signal from a first antenna; a second RF input to receive a second RF signal; at least one baseband output terminal configured to output at least one of a first output signal or a second output signal; a signal path coupled between the first and the second RF inputs and the at least one baseband output terminal, wherein the signal path includes a first 90° hybrid coupler and a quadrature down-converter. The first 90° hybrid coupler includes a first port and a second port, where the first 90° hybrid coupler is configured to receive the first RF signal at the first port and the second RF signal at the second port, generate a first coupler output signal based on the first RF signal and the second RF signal, and generate a second coupler output signal based on the first RF signal and the second RF signal. The quadrature down-converter is configured to down-convert the first coupler output signal into a first baseband signal and down-convert the second coupler output signal into a second baseband signal. The RF circuit further includes a baseband combiner circuit configured to combine the first baseband signal and the second baseband signal to generate at least one of the first output signal or the second output signal.

One or more embodiments provide a method of isolating a first RF signal from a second RF signal and vice versa in an RF circuit. The method includes: generating, by a 90° hybrid coupler, a first coupler output signal based on the first RF signal and the second RF signal; generating, by the 90° hybrid coupler, a second coupler output signal based on the first RF signal and the second RF signal; down-converting, by a quadrature down-converter, the first coupler output signal into a first baseband signal; down-converting, by the quadrature down-converter, the second coupler output signal into a second baseband signal; and combining, by a baseband combiner circuit, the first baseband signal and the second baseband signal to generate at least one of a first output signal representative of the first RF signal and a second output signal representative of the second RF signal.

BRIEF DESCRIPTION OF THE DRAWINGS

Embodiments are described herein making reference to the appended drawings.

DETAILED DESCRIPTION

Figure 1:
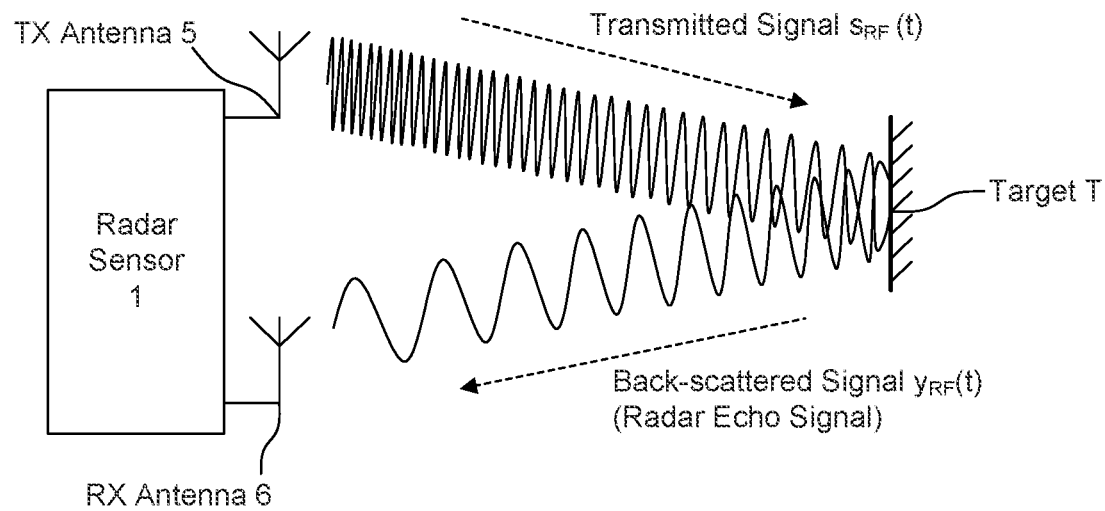
FIG. 1 is a drawing illustrating the operating principle of a frequency-modulated continuous-wave (FMCW) radar system for distance and/or velocity measurement according to one or more embodiments.

In the following, details are set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

The term "substantially" may be used herein to account for small manufacturing tolerances (e.g., within 5%) that are deemed acceptable in the industry without departing from the aspects of the embodiments described herein.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

One or more aspects of the present disclosure may be implemented as a non-transitory computer-readable recording medium having recorded thereon a program embodying methods/algorithms for instructing the processor to perform the methods/algorithms. Thus, a non-transitory computer-readable recording medium may have electronically readable control signals stored thereon, which cooperate (or are capable of cooperating) with a programmable computer system such that the respective methods/algorithms are performed. The non-transitory computer-readable recording medium can be, for example, a CD-ROM, DVD, Blu-ray disc, a RAM, a ROM, a PROM, an EPROM, an EEPROM, a FLASH memory, or an electronic memory device.

Each of the elements of the present disclosure may be configured by implementing dedicated hardware or a software program on a memory controlling a processor to perform the functions of any of the components or combinations thereof. Any of the components may be implemented as a central processing unit (CPU) or other processor reading and executing a software program from a recording medium such as a hard disk or a semiconductor memory device. For example, instructions may be executed by one or more processors, such as one or more CPUs, digital signal processors (DSPs), general-purpose microprocessors, application-specific integrated circuits (ASICs), field programmable logic arrays (FPGAs), programmable logic controller (PLC), or other equivalent integrated or discrete logic circuitry.

Accordingly, the term "processor," as used herein refers to any of the foregoing structures or any other structure suitable for implementation of the techniques described herein. A controller including hardware may also perform one or more of the techniques of this disclosure. A controller, including one or more processors, may use electrical signals and digital algorithms to perform its receptive, analytic, and control functions, which may further include corrective functions. Such hardware, software, and firmware may be implemented within the same device or within separate devices to support the various techniques described in this disclosure.

A signal processing circuit and/or a signal conditioning circuit may receive one or more signals from one or more components and perform signal conditioning or processing thereon. Signal conditioning, as used herein, refers to manipulating a signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a signal suitable for processing after conditioning.

Thus, a signal processing circuit may include an analog-to-digital converter (ADC) that converts the analog signal from the one or more sensor elements to a digital signal. The signal processing circuit may also include a DSP that performs some processing on the digital signal.

Embodiments are discussed below in the context of a radar system. It should be noted, however, that the described embodiments may also be applied in applications different from radar such as, for example, RF transceivers of RF communication devices.

FIG. 1 illustrates a frequency-modulated continuous-wave (FMCW) radar system 1. In the present example, separate transmission (TX) and reception (RX) antennas 5 and 6, respectively, are used. However, it is noted that a single antenna can be used so that the transmission antenna and the reception antenna are physically the same (monostatic radar configuration). It will be appreciated that "(t)" denotes an analog signal defined as a continuous wave that may change over a time period t, and "(k)" denotes a digital signal defined as a discrete wave, where k is an integer and may represent a kth digital sample or a digital signal containing k digital samples. A signal may be represented with or without its analog or digital domain identifier (t) and (k), respectively.

The transmission antenna continuously radiates an RF signal $S_{RF}(t)$, which is frequency-modulated, for example, by a periodic linear frequency ramp signal (also referred to as frequency sweep or chirp signal). The transmitted signal $S_{RF}(t)$ is back-scattered at a target T, which is located in the radar channel within the measurement range of the radar device. The back-scattered signal $y_{RF}(t)$ is received by the reception antenna 6 as a radar echo. In the depicted example, the back-scattered signal is denoted as $y_{RF}(t)$.

Figure 2:
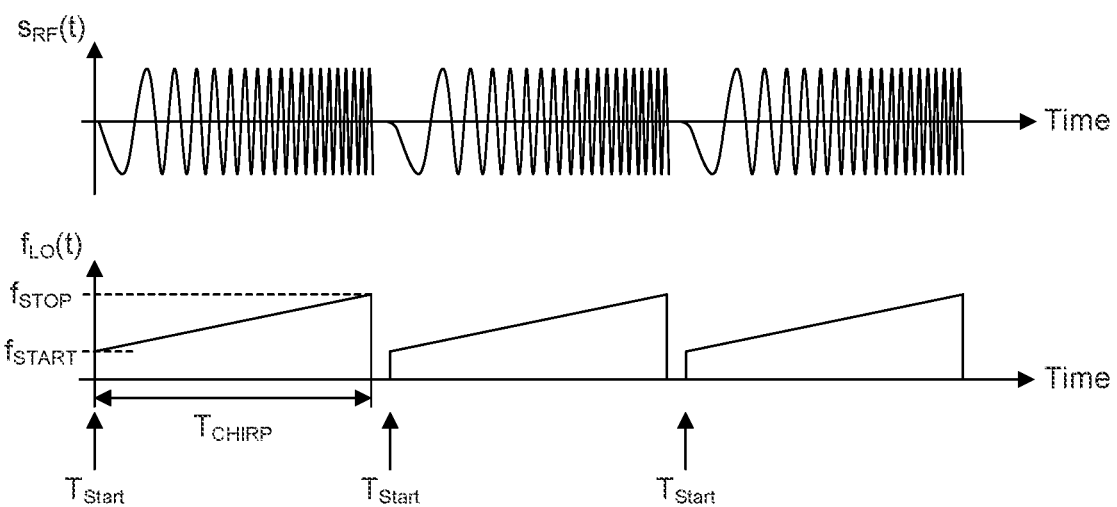
FIG. 2 includes two timing diagrams illustrating the frequency modulation of the radio frequency (RF) signal used in FMCW radar systems according to one or more embodiments.

FIG. 2 includes two timing diagrams illustrating the frequency modulation of the RF signal $S_{RF}(t)$ used in FMCW radar systems. As shown in FIG. 2, the signal $S_{RF}(t)$ may be composed of a plurality of frequency ramps or "chirps", that is to say the signal $S_{RF}(t)$ comprises a sequence of sinusoidal signal profiles (waveforms) with rising frequency (up-chirp) or falling frequency (down-chirp). In the present example, the instantaneous frequency $f_{LO}(t)$ of a chirp increases linearly, starting at a start frequency $f_{START}$ to a stop frequency $f_{STOP}$ within a time interval $T_{CHIRP}$. Such chirps are also referred to as linear frequency ramps.

A frequency-modulated ramp signal, such as local oscillator signal used for generating a radar signal, may include a plurality of radar frames which may also be referred to as radar operation cycles or chirp frames. A sequence of ramps may make up each a radar frame. For example, a radar operation cycle may include several hundreds of radar ramps (sweeps) taking up to 10-30 ms in total. A frame length of the radar frame corresponds to one radar operation cycle. It is also to be noted that consecutive ramps have a short pause therebetween and a longer pause may be used between consecutive radar frames. The longer pause between consecutive radar frames may be referred to as a configuration interval during which one or more ramp parameters of the RF signal $S_{RF}(t)$ can be adjusted for subsequent radar frames. A ramp start time $T_{START}$ indicates a start time for each chirp and may be a predetermined interval according to, for example, a number of clock cycles.

It will be appreciated that the start frequency $f_{START}$ and stop frequency $f_{STOP}$ of the ramps may be within a frequency band with minimum frequency Fmin and maximum frequency Fmax. As such, frequency Fmin and frequency Fmax define an operating frequency range or the frequency band usable for the ramping signals, and, thus, the frequency range or the frequency band of the radar application of the radar MMIC. In some embodiments, the frequency range defined by a single ramp having start and stop frequencies $f_{START}$ and $f_{STOP}$ may be smaller than the usable radar frequency band. However, all ramps that are generated during operation lie between the frequencies Fmin and Fmax of the radar frequency band (e.g., between 76-81 GHz) used for generating the ramping signals.

FIG. 2 illustrates three identical linear frequency ramps or chirps. It is noted, however, that the parameters $f_{START}$, $f_{STOP}$, $T_{CHIRP}$ as well as the pause between the individual frequency ramps may vary dependent on the actual implementation and use of the radar device 1. In practice, the frequency variation may be, for example, linear (linear ramp, frequency ramp), exponential (exponential ramp), or hyperbolic (hyperbolic ramp). In some embodiments, the frequency may decrease instead of increase during time $T_{CHIRP}$. Furthermore, in other embodiments the center frequency of each ramp (and therefore $f_{START}$ and $f_{STOP}$) may vary (e.g. from ramp to ramp or after detecting an interference) to allow using the full or a part of the frequency band. In one example, the frequency band has a minimum frequency Fmin of 76 GHz and a maximum frequency Fmax of 81 GHz.

Figure 3:
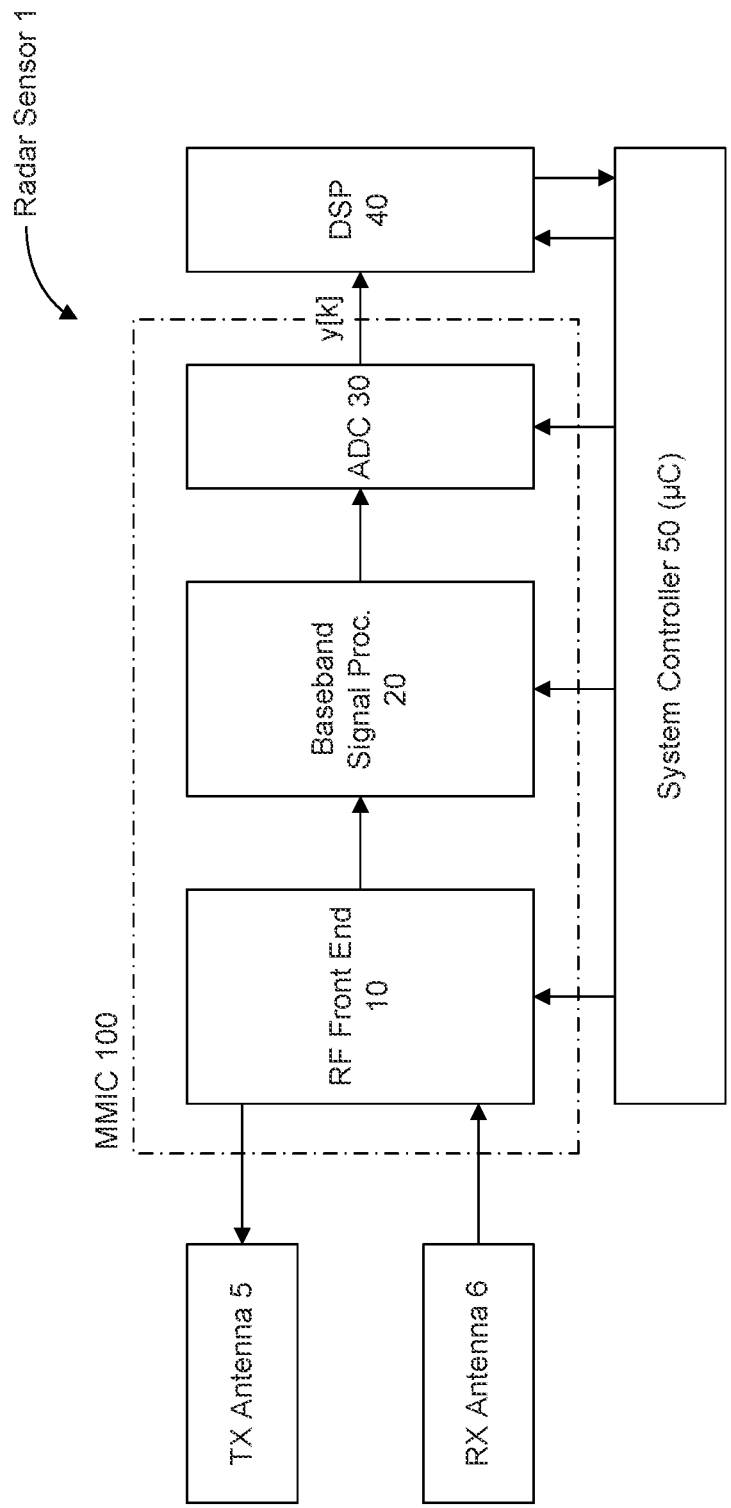
FIG. 3 is a block diagram illustrating the basic structure of an FMCW radar device according to one or more embodiments.

Thus, while three identical linear frequency ramps or chirps with the same start frequency $f_{START}$ and stop frequency $f_{STOP}$ are illustrated in FIG. 2, it is contemplated that the start frequency $f_{START}$ and stop frequency $f_{STOP}$ may vary within a radar frame or across multiple radar frames. A local oscillator signal $S_{LO}(t)$ is used to generate the RF signal $S_{RF}(t)$. Thus, is can be said that the local oscillator signal $S_{LO}(t)$ and the RF signal $S_{RF}(t)$ are frequency-modulated ramp signals that are generated within an operating frequency range (e.g., a predefined radar frequency range). For example, the local oscillator signal $S_{LO}(t)$ is a frequency-modulated ramp signal that includes a plurality of frequency ramps each starting at a respective ramp start frequency and ending at a respective ramp stop frequency and the respective ramp start frequencies and the respective ramp stop frequencies of the plurality of frequency ramps define a frequency range within the bounds of the operating frequency range. The frequency range of the plurality of frequency ramps is defined by the lowest start frequency $f_{START}$ and the highest stop frequency $f_{STOP}$ among the frequency ramps in a given time interval. As noted above, the start frequency $f_{START}$ and the stop frequency $f_{STOP}$ of a sequence of frequency ramps may be the same and thus the center frequency of each ramp may be constant. Alternatively, the center frequency of each ramp (and therefore $f_{START}$ and $f_{STOP}$) may vary from ramp to ramp or after detecting an interference. The bandwidth (i.e., frequency range) of each ramp may also vary from ramp to ramp or after detecting an interference FIG. 3 is a block diagram that illustrates an exemplary structure of a radar device 1 (radar sensor). It is noted that a similar structure may also be found in RF transceivers used in other applications such as, for example, in wireless communications systems. Accordingly, at least one transmission antenna 5 (TX antenna) and at least one reception antenna 6 (RX antenna) are connected to an RF frontend 10, which may be integrated in a monolithic microwave integrated circuit (MMIC) 100.

The RF frontend 10 may include all the circuit components needed for RF signal processing. Such circuit components may (but need not necessarily) include, for example, a local oscillator (LO), RF power amplifiers, low noise amplifiers (LNAs), directional couplers such as rat-race-couplers and circulators, and mixers for the down-conversion (demodulation) of RF signals (e.g., the received signal $y_{RF}(t)$, see FIG. 1) into the baseband or an intermediate frequency (IF) band.

It is noted that antenna-arrays may be used instead of single antennas. The depicted example shows a bistatic (or pseudo-monostatic) radar system which has separate RX and TX antennas. In the case of a monostatic radar system, a single antenna or a single antenna array may be used to both receive and transmit electromagnetic (radar) signals. In this case, a directional coupler (e.g., a circulator) may be used to separate RF signals to be transmitted to the radar channel from RF signals received from the radar channel. In practice, radar systems often include several transmission (TX) and reception (RX) channels, which among others allows the measurement of the direction (direction of arrival (DoA)), from which the radar echoes are received.

In the case of a FMCW radar system, the transmitted RF signals radiated by the TX antenna 5 are in the range between approximately 20 GHz and 100 GHz (e.g., in the frequency band 21 to 26 GHz or in the frequency band 76 to 81 GHz). As mentioned, the RF signal $y_{RF}(t)$ received by the RX antenna 6 includes the radar echoes, i.e., the signal back-scattered at the so-called radar targets.

The received RF signals $y_{RF}(t)$ are down-converted into the baseband (IF band) and further processed in the baseband using analog signal processing (see FIG. 3, baseband signal processing chain 20), which basically includes filtering and amplification of the baseband signal. The baseband signal may also be referred to as analog radar data. It will be appreciated that if the received RF signals are down-converted into the IF band, the baseband signal processing chain 20 may be referred to as an IF signal processing chain. Thus, the analog baseband signal processing chain 20, in general, may also be referred to as an analog signal processing chain 20. The baseband signal is finally digitized using one or more analog-to-digital converters (ADC) 30 and further processed in the digital domain (see FIG. 3, digital signal processing chain implemented, e.g., in digital signal processor (DSP) 40). Thus, the ADC 30 is configured to generate a digital signal y(k) from the down-converted baseband signal.

The RF frontend 10 and the analog baseband signal processing chain 20 may be integrated in a single MMIC 100. Optionally, the ADC 30 may also be integrated in the MMIC 100 and outputs the digital signal y(k) to the DSP 40 for further processing. The ADC 30 may part of a digital front end (DFE) circuit of the MMIC 100 that includes additional circuitry that performs digital processing on the digital signal before outputting the digital signal y(k) from the MIMIC 100 as the digital radar data.

The digital signal y(k) is representative of the radar data received in the RF signal $y_{RF}(t)$ and is further output from the digital data output terminal $D_{OUT}$ as a digital output signal, and provided to the DSP 40 that is external to the MMIC 100.

The overall system is controlled by a system controller 50 (e.g., a microcontroller), which may be at least partly implemented using a processor executing appropriate firmware. The processor may be included, e.g., in a microcontroller, a digital signal processor, or the like. The DSP 40 may be part of the system controller 50 or separate therefrom. The signal processor and system controller may be integrated in an application specific integrated circuit (ASIC). The DSP 40 may be configured to receive the digital radar data in the digital signal y(k) and process the digital radar data using the ramp parameters (e.g. respective ramp start frequencies, the respective ramp stop frequencies, a bandwidth of the first frequency range, a ramp start time, or a sampling start time) used to generate the respective frequency ramps of the RF signal $y_{RF}(t)$ in order to generate a range doppler map, which may then be further used by the DSP 40 for object detection, classification, and so on.

While the RF frontend 10 and the analog baseband signal processing chain 20 (and optionally the ADC 30) may be integrated in a single MIMIC, the components shown in FIG. 3 may be distributed among two or more integrated circuits. Particularly, some parts of the digital signal processing may be done in the MMIC 100.

Figure 4:
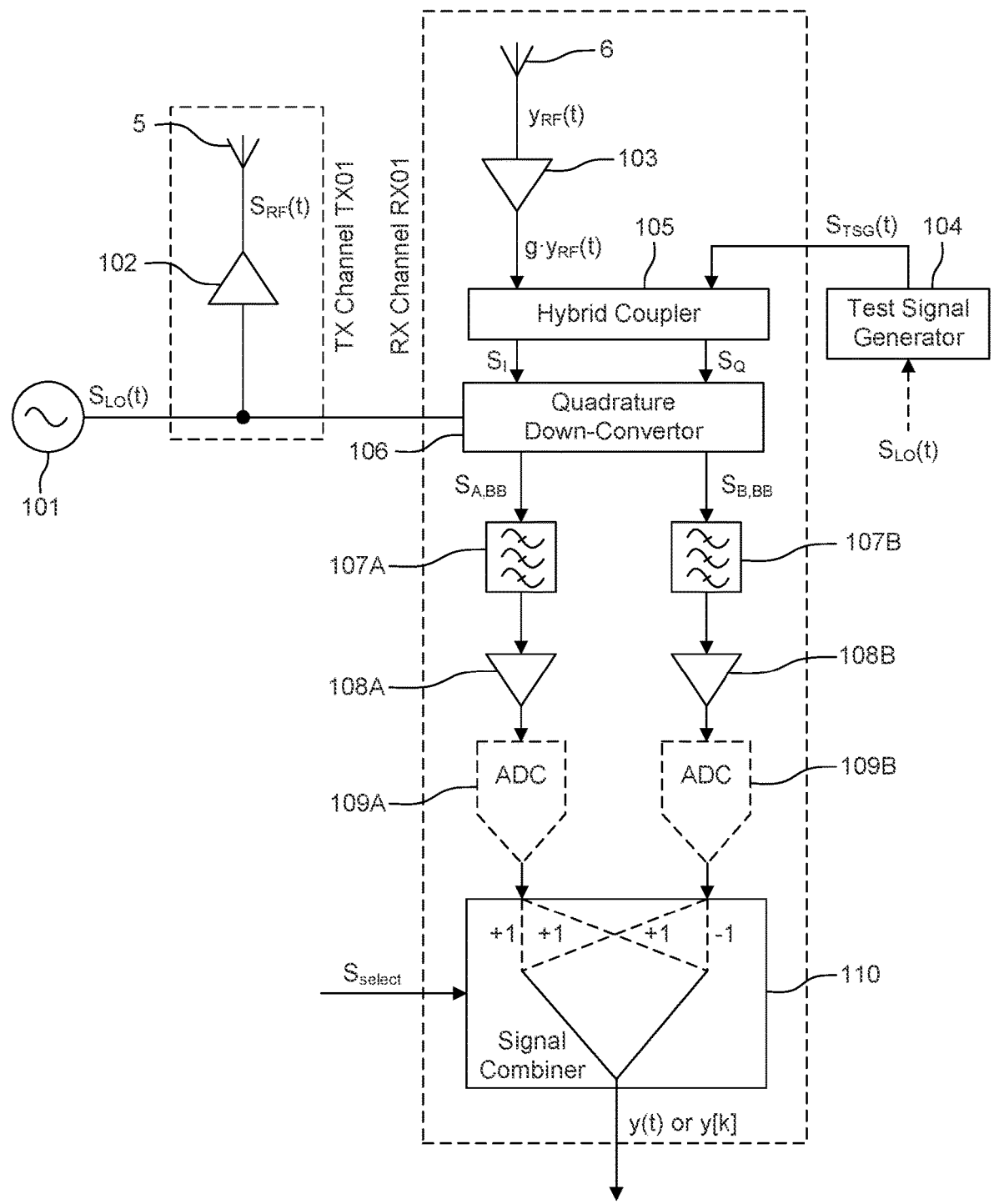
FIG. 4 illustrates one exemplary implementation of a RF frontend and a baseband signal processing chain of a radar MMIC according to one or more embodiments.

FIG. 4 illustrates one exemplary implementation of the RF frontend 10 and the baseband signal processing chain 20 of a radar MIMIC according to one or more embodiments. It is noted that FIG. 4 is a simplified circuit diagram illustrating one transmission channel and one receiver channel. Actual implementations, which may heavily depend on the application, are of course more complex and include several RX and/or TX channels. The RF frontend 10 includes a transmission channel (TX01) and a reception channel (RX01). While only one transmission channel and one reception channel are shown, the MIMIC 100 may include multiple transmission channels and/or multiple reception channels with similar components.

The RF frontend 10 includes a local oscillator (LO) 101 that generates an RF signal $S_{LO}(t)$, which may be the frequency-modulated ramp signal as explained above with reference to FIG. 2 having a modulated frequency $f_{LO}(t)$. For this reason, the local oscillator 101 may also be referred to as a ramp signal generator. The RF signal $S_{LO}(t)$ is also referred to as LO signal or a reference signal. In radar applications, the LO signal is usually in the SHF (Super High Frequency) or the EHF (Extremely High Frequency) band, e.g., between 76 GHz and 81 GHz in automotive applications. The LO signal may also be generated at a lower frequency and then up-converted using frequency multiplication units. The local oscillator 101 may be part of a phase-locked loop (PLL) circuit from which the RF signal $S_{LO}(t)$ is output.

The LO signal $S_{LO}(t)$ is processed in the transmission signal path as well as in the receive path (i.e., in the transmission and reception channels). The transmission signal $S_{RF}(t)$ (outgoing radar signal), which is radiated by the TX antenna 5, is generated by amplifying the LO signal $S_{LO}(t)$, e.g., using an RF power amplifier 102. The transmission channel may also include a phase shifter (not illustrated) for applying a phase shift to the LO signal $S_{LO}(t)$. For example, the phase shifter may be used to manipulate the overall phase lag caused by the transmission channel. The output of the RF power amplifier 102 is coupled to the TX antenna 5.

The power level of the RF power amplifier 102 may be set and adjusted by a controller of the MMIC 100. For example, by setting the power level of the RF power amplifier 102, the transmit power of the transmission channel may be set to a transmission power while the local oscillator 101 generates the LO signal $S_{LO}(t)$ with the frequency ramps intended to be transmitted as the transmission signal $S_{RF}(t)$ and received as back-scattered signal $y_{RF}(t)$ for the processing of radar data. Alternatively, the transmit power of the transmission channel may be set to zero or to a reduced power level significantly lower than the transmission power via setting the power level of the RF power amplifier 102 accordingly. For example, the gain of the RF power amplifier 102 may be set to zero or near zero. By doing so, the transmission channel is effectively turned off or substantially turned off so that little to no signal is transmitted or received by the MMIC 100 via back-scattering.

It is to be noted that while some examples describe the received RF signal $y_{RF}(t)$ as one resulting from the back-scattering of a transmitted signal $S_{RF}(t)$ of the MMIC 100, the received RF signal $y_{RF}(t)$ could also be a signal that originated from a different MMIC, such as one from another vehicle. The, the received RF signal $y_{RF}(t)$ may refer to any RF signal received by the RX antenna 6 from an environment external to the MMIC 100.

The received RF signal $y_{RF}(t)$ (incoming radar signal), which is provided by the RX antenna 6, is provided to a first port of a 90° hybrid coupler 105. The first port is commonly known as "input port" by those reasonably skilled in the art. The input port is used as a first input terminal of the 90° hybrid coupler 105. In the present example, the received RF signal $y_{RF}(t)$ (i.e., the antenna signal) is pre-amplified by RF amplifier 103 (gain g), so that the 90° hybrid coupler 105 receives the amplified RF signal $g \cdot y_{RF}(t)$ at its RF input port.

The radar sensor 1 further includes a test signal generator 104 that generates an RF test signal $S_{TSG}(t)$ (i.e., an RX monitoring signal) that is provided to a fourth port of a 90° hybrid coupler 105. Such fourth port is commonly known as "isolated port" by those reasonably skilled in the art, and it is typically used as an output port and not as an input port. In contrast, the isolated port in the disclosed embodiments is used as a second input terminal of the 90° hybrid coupler 105. The RF test signal $S_{TSG}(t)$ may be injected into the 90° hybrid coupler either during a reception channel monitoring operation or, in some embodiments, also during a radar operation. The test signal $S_{TSG}(t)$ may also be pre-amplified by one or more RF amplifiers similar to RF amplifier 103.

The test signal generator 104 may be a signal generator that generates the RF test signal $S_{TSG}(t)$ based on configured parameters or may be another component that manipulates the LO signal $S_{LO}(t)$ to generate the test signal $S_{TSG}(t)$ therefrom. In other words, in some cases, the test signal $S_{TSG}(t)$ may be generated separately from the LO signal $S_{LO}(t)$, although the two signals may be synthesized from a same reference clock. In other cases, the test signal $S_{TSG}(t)$ may be derived from the LO signal $S_{LO}(t)$, where the test signal $S_{TSG}(t)$ may be shifted in phase from the LO signal $S_{LO}(t)$ by the predetermined offset phase by the test signal generator 104. In this way, the test signal $S_{TSG}(t)$ and the LO signal $S_{LO}(t)$ would have the same frequency ramp profile. In one example, the test signal generator 104 may be a phase shifter that receives the LO signal $S_{LO}(t)$ from the local oscillator 101 and applies a preconfigured phase shift to the LO signal $S_{LO}(t)$ to generate the test signal $S_{TSG}(t)$. The preconfigured phase shift may be zero or non-zero. If the preconfigured phase shift is set to zero, the phase shifter simply passes the LO signal $S_{LO}(t)$ on as the test signal $S_{TSG}(t)$.

The 90° hybrid coupler 105 receives the received RF signal $y_{RF}(t)$ at one of its input ports and the test signal $S_{TSG}(t)$ at the other of its input ports. The hybrid coupler 105 is a four-port directional coupler that splits each input signal equally between two output ports (i.e., I/Q outputs), for example, by an attenuation of 3 dB. An attenuation of 3 dB corresponds to cutting the power of a signal in half. The signals at the outputs have a 90-degree phase difference between them. The I-port, also known as "second port", "through port", or "transmitted port" by those skilled in the art, is in-phase with respect to the first input port, where $y_{RF}(t)$ is connected, and in quadrature with respect to the second input port, where $S_{TSG}(t)$ is connected. The Q-port, also known as "third port" or "coupled port" by those skilled in the art, is in-phase with respect to the second input port, where $S_{TSG}(t)$ is connected, and in quadrature with respect to the first input port, where $y_{RF}(t)$ is connected. This type of coupler is also known as a quadrature coupler. In other words, the output signals derived from the same input signal are in quadrature with each other, with one output signal being in phase with the input signal and the other output signal being shifted 90 degrees from the input signal and both with half the power thereof.

Figure 8:
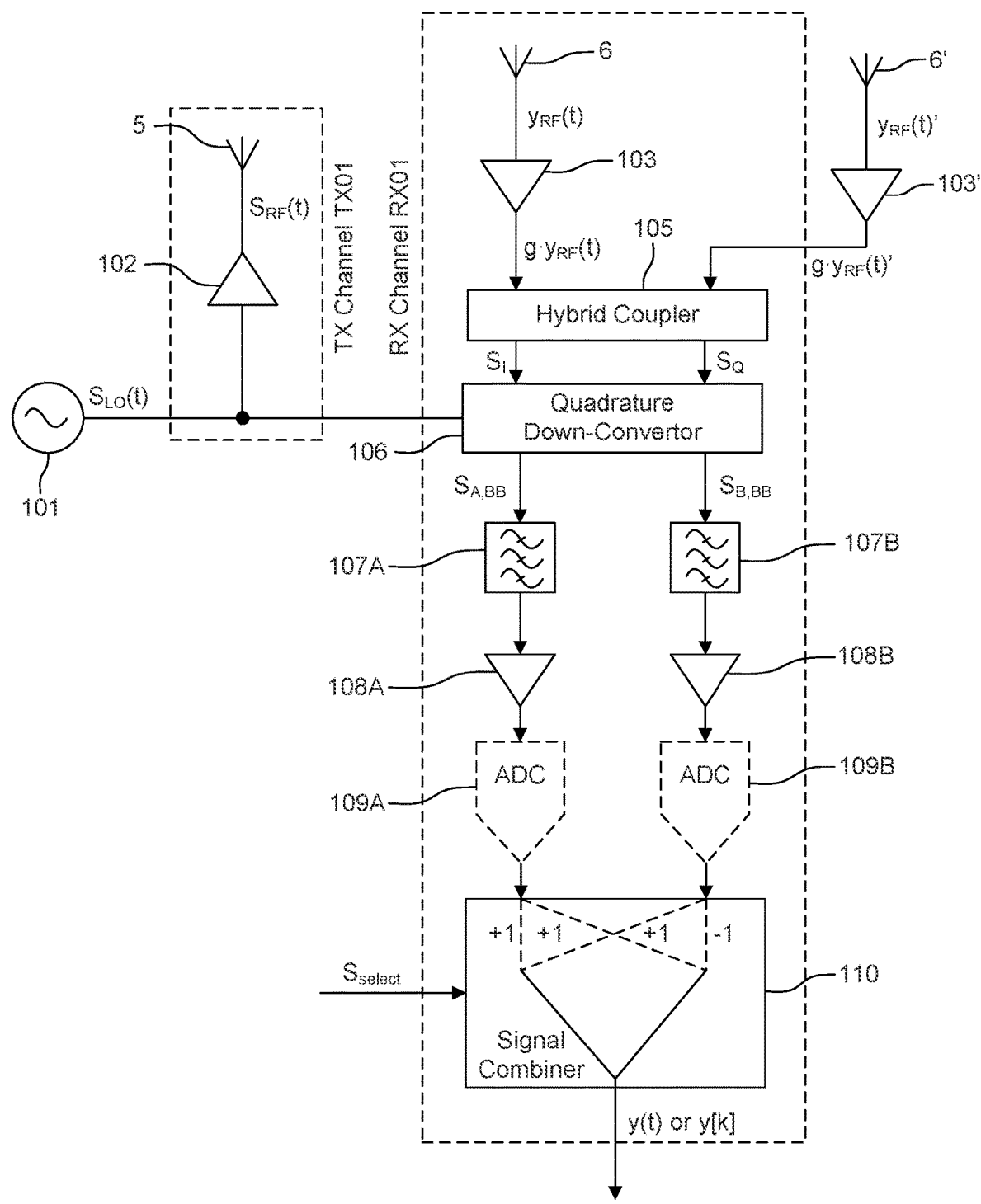
FIG. 8 illustrates another exemplary implementation of a RF frontend and a baseband signal processing chain of a radar MIMIC according to one or more embodiments.

The 90° hybrid coupler 105 includes an input port, an isolated port, a transmitted port, and a coupled port. The input port and the isolated port are used as input ports and the transmitted port and the coupled port are used as output ports. Specifically, the input port is configured to receive the received RF signal $y_{RF}(t)$ and the isolated port is configured to receive a second RF signal (e.g., the RF test signal $S_{TSG}(t)$, as shown in FIG. 4, or a second RF signal that is received from a second antenna, as shown in FIG. 8).

Here, the received RF signal $y_{RF}(t)$ is split equally into a first signal component $S_{RF,I}(e^{j\omega LO}(e^{j\omega IF}))$ and a second signal component $S_{RF,Q}(je^{j\omega LO}(e^{j\omega IF}))$. Similarly, test signal $S_{TSG}(t)$ is split equally into a first signal component $S_{TSG,I}$ $(e^{j\omega LO}e^{j\omega TSG})$ and a second signal component $S_{TSG,Q}$ $(je^{j\omega LO}e^{j\omega TSG})$. The second component of the received RF signal $y_{RF}(t)$ is 90° phase shifted from the first component of the received RF signal $y_{RF}(t)$ by the 90° hybrid coupler 105, and the second component of the test signal $S_{TSG}(t)$ is 90° phase shifted from the first component of the test signal $S_{TSG}(t)$ by the first 90° hybrid coupler 105.

The signal components $S_{RF,I}$ and $S_{TSG,Q}$ are superimposed onto each other (i.e., combined or summed) by the 90° hybrid coupler 105 to produce a first coupler output signal $S_I$. Likewise, the signal components $S_{RF,Q}$ and $S_{TSG,I}$ are superimposed onto each other (i.e., combined or summed) by the 90° hybrid coupler 105 to produce a second coupler output signal $S_Q$. The 90° hybrid coupler 105 provides I/Q outputs from both the received signal $y_{RF}(t)$ and the test signal $S_{TSG}(t)$ according to equations (1)-(5):

$$y_{RF} = e^{j\omega LO}(e^{j\omega IF}) \quad (1);$$

$$S_{TSG} = e^{j\omega LO}e^{j\omega TSG} \quad (2);$$

$$\omega_{LO} \gg \omega_{IF}, \omega_{TSG} \quad (3);$$

$$S_I = e^{j\omega LO}(e^{j\omega IF}) + je^{j\omega LO}e^{j\omega TSG} \quad (4); \text{ and}$$

$$S_Q = je^{j\omega LO}(e^{j\omega IF}) + e^{j\omega LO}e^{j\omega TSG} \quad (5).$$

The "ω" refers to a frequency component (i.e., angular frequency) of a signal and "$e^{j\omega}$" is a frequency tone. In particular, ω=2pi*f, where f is the frequency. Accordingly, ωLO is a frequency component of the LO signal $S_{LO}(t)$, ωIF is an intermediate frequency component of the received RF signal $y_{RF}(t)$, and ωTSG is a frequency component of the test signal $S_{TSG}(t)$. In the circumstance that the received RF signal $y_{RF}(t)$ and the test signal $S_{TSG}(t)$ are generated from the LO signal, they also include the frequency component thereof.

A five-port quadrature down-converter 106 receives the LO signal $S_{LO}(t)$ at its reference input port and is configured to down-convert (e.g., demodulate) both the first coupler output signal $S_I$ and the second coupler output signal $S_Q$ into respective baseband signals $S_{A,BB}$ and $S_{B,BB}$ using the LO signal $S_{LO}(t)$. Accordingly, the quadrature down-converter 106 marks the end of the RF signal path of the receiver channel that starts with the input terminal that is connected to antenna 6. The quadrature down-converter 106 performs a down-conversion to convert the first coupler output signal $S_I$ into the baseband, resulting in baseband signal $S_{A,BB}$. Similarly, the quadrature down-converter 106 performs a down-conversion to convert the second coupler output signal $S_Q$ into the baseband, resulting in baseband signal $S_{B,BB}$. The quadrature down-converter 106 operates in such a way, that if the same signal would be fed to both its inputs, the respective baseband output signals would be 90° phase shifted with respect to each other. In other words, if $S_I$ would be equal to $S_Q$, then $S_{A,BB}$ would show an absolute phase shift of 90° compared to $S_{B,BB}$.

The baseband signals $S_{A,BB}$ and $S_{B,BB}$ may be further processed by the analog baseband signal processing chain 20 (see also FIG. 3), which basically includes one or more filters (e.g., a band-pass or low pass filters 107A and 107B) to remove undesired side bands and image frequencies as well as one or more amplifiers, such as amplifiers 108A and 108B.

After quadrature down-conversion, which can be modeled by multiplying equations (4-5) by quadrature LO signals, which can be modeled by equations (6-7), and subsequently by applying low-pass filtering, the baseband signals $S_{A,BB}$ and $S_{B,BB}$ can be represented by equations (8)-(9):

$$S_{LO,I} = e^{-j\omega LO} \quad (6);$$

$$S_{LO,Q} = je^{-j\omega LO} \quad (7);$$

$$S_{A,BB} = (e^{j\omega IF}) + je^{j\omega TSG} \quad (8);$$

$$S_{B,BB} = j^2(e^{j\omega IF}) + je^{j\omega TSG} \quad (9).$$

The analog output signals of the baseband signal processing chain 20 are supplied to a signal combiner 110 that performs a linear combination to combine the two baseband signals $S_{A,BB}$ and $S_{B,BB}$ to generate a first output signal Out1 (e.g., a radar baseband signal) or a second output signal Out2 (e.g., a test baseband signal). This output signal is denoted as y(t) and is representative of either the received signal $y_{RF}(t)$ (incoming radar signal) or the injected (input) test signal $S_{TSG}(t)$ depending on which linear combination technique is used. The signal combiner 110 is a baseband combiner circuit that provides a double-pole, single-output switch functionality.

During a radar operation mode, the signal combiner 110 may be configured to subtract baseband signal $S_{B,BB}$ from baseband signal $S_{A,BB}$ to generate first output signal Out1 as output signal y(t). Due to the architecture of the hybrid coupler 105 and the quadrature down-converter 106, signal components originating from the (input) test signal $S_{TSG}(t)$ are canceled out by the subtraction, or in more realistic implementations, substantially canceled out, which takes into account imperfections that would be deemed common in the industry without departing from the aspects of the embodiments described herein. Thus, the first output signal Out1 is sensitive to the received RF signal $y_{RF}(t)$, while being insensitive or substantially insensitive to the test signal $S_{TSG}(t)$. In other words, the first output signal Out1 is dependent on the characteristics of the received RF signal $y_{RF}(t)$ and is independent or substantially independent of the test signal $S_{TSG}(t)$. A change at the received RF signal $y_{RF}(t)$ causes a detectable change at the first output signal Out1, whereas a change at the test signal $S_{TSG}(t)$ does not cause a detectable change at the first output signal Out1. In other words, the first output signal Out1 is free or substantially free of signal components originating from the test signal $S_{TSG}(t)$.

It is noted that according to equation (10), the first output signal Out1 is in-phase with the received RF signal $y_{RF}(t)$.

$$Out1 = S_{A,BB} - S_{B,BB} = 2(e^{j\omega IF}) \quad (10)$$

During RX monitoring mode, the signal combiner 110 may be configured to add the baseband signals $S_{A,BB}$ and $S_{B,BB}$ together to generate second output signal Out2 as output signal y(t). Due to the architecture of the hybrid coupler 105 and the quadrature down-converter 106, signal components originating from received signal $y_{RF}(t)$ are canceled out by the addition. Thus, the second output signal Out2 is sensitive to the test signal $S_{TSG}(t)$, while being insensitive or substantially insensitive to the received RF signal $y_{RF}(t)$. In other words, the second output signal Out2 is dependent on the characteristics of the test signal $S_{TSG}(t)$ and is independent of the received RF signal $y_{RF}(t)$. A change at the test signal $S_{TSG}(t)$ causes a detectable change at the second output signal Out2, whereas a change at the received RF signal $y_{RF}(t)$ does not cause a detectable change at the second output signal Out2. In other words, the second output signal Out2 is free or substantially free of signal components originating from the received RF signal $y_{RF}(t)$.

It is noted that according to equation (11), the second output signal Out2 is in quadrature with test signal $S_{TSG}(t)$ (i.e., it is phase shifted 90 degrees from the input test signal $S_{TSG}(t)$).

$$Out2 = S_{A,BB} S_{B,BB} = 2(je^{j\omega TSG}) \quad (11)$$

It shall be also noted that other relative phase combinations leading to Equations (10) and (11) are also possible depending on the relative connection of SI/SQ and the relative phase of the downconverter outputs (+ or −90°), providing the sign of the linear combination is properly chosen.

The signal combiner 110 is configured to receive a mode-select control signal Sselect that selectively controls the signal combiner 110 to perform one of the linear algorithms on the two baseband signals $S_{A,BB}$ and $S_{B,BB}$ to generate one of the output signals, the first output signal Out1 or the second output signal Out2, as the output signal y(t). In this way, the signal combiner 110 selectively generates either the first output signal Out1 during a radar operation to output radar data or the second output signal Out2 during an RX monitoring operation to output test data, with the selected output signal being free from unwanted signal components of the unwanted input signal. In this way, both input signals $y_{RF}(t)$ and $S_{TSG}(t)$ can be received simultaneously without impacting either of the radar operation or the RX monitoring operation.

The signal combiner 110 may be a programmable baseband signal combiner configured to generate the first output signal Out1 as a first linear combination of the two baseband signals $S_{A,BB}$ and $S_{B,BB}$ and generate the second output signal Out2 as a second linear combination of the two baseband signals $S_{A,BB}$ and $S_{B,BB}$, where the second linear combination is different from the first linear combination. The signal combiner 110 is configured to receive a mode select control signal Sselect and selectively generate either the first output signal Out1 or the second output signal Out2 based on the mode select control signal Sselect. In other words, with the signal combiner 110 configured in in a single output mode, the radar and RX monitoring modes are performed with time-division multiplexing in accordance with the mode select control signal Sselect. The mode select control signal Sselect may be generated by the system controller 50 for controlling the output of the signal combiner 110.

It will be further appreciated that the signal combiner 110 can be configured into a dual output mode to perform both linear combinations simultaneously in order to generate and output both output signals first output signal Out1 and second output signal Out2 in parallel. This would have the added benefit of operating both radar and RX monitoring modes in parallel, as opposed to sequentially, to enable continuous radar operation/detection and RX monitoring. The mode select control signal Sselect may be used to place the signal combiner 110 into dual output mode.

The output signal y(t) may be supplied to an ADC 30 (see also FIG. 3). The digital signal y[k] output by the ADC 30 is referred to as digital radar signal that includes the digital radar data. It is understood that the digital radar signal is partitioned into frames that correspond to the chirp frames of the LO signal $S_{LO}(t)$, and each frame of the digital radar signal can be subdivided into a plurality of segments corresponding to the plurality of chirps in the corresponding chirp frame. One data acquisition (e.g., one measurement process) uses the acquisition of one frame of digital radar data, wherein the data acquisition is repeated at a defined (frame) repetition rate. The digital radar signal (e.g., frame by frame) may be supplied to a processor such as digital signal processor 40, which is programmed to further process the digital radar signal, e.g., by applying algorithms summarized as Range/Doppler processing. Various techniques for the digital post-processing of the digitized output signals (digital radar signal) are as such known (e.g., Range Doppler Analysis) and thus not further explained herein.

Optionally, instead of the ADC 30 being provide downstream from the signal combiner 110, ADCs 109A and 109B may be provided upstream to (i.e., prior to) the signal combiner 110 to convert the baseband signals $S_{A,BB}$ and $S_{B,BB}$ into their digital form (i.e., into their respective DC values). In this case, the signal combiner 110 is configured to operate in the digital domain in order to combine the respective digital signals into digital output signals first output signal Out1 and second output signal Out2. This output signal is denoted as y[k] and is representative of either the received signal $y_{RF}(t)$ (incoming radar signal) or the injected (input) test signal $S_{TSG}(t)$ depending on which linear combination technique is used.

Figure 5:
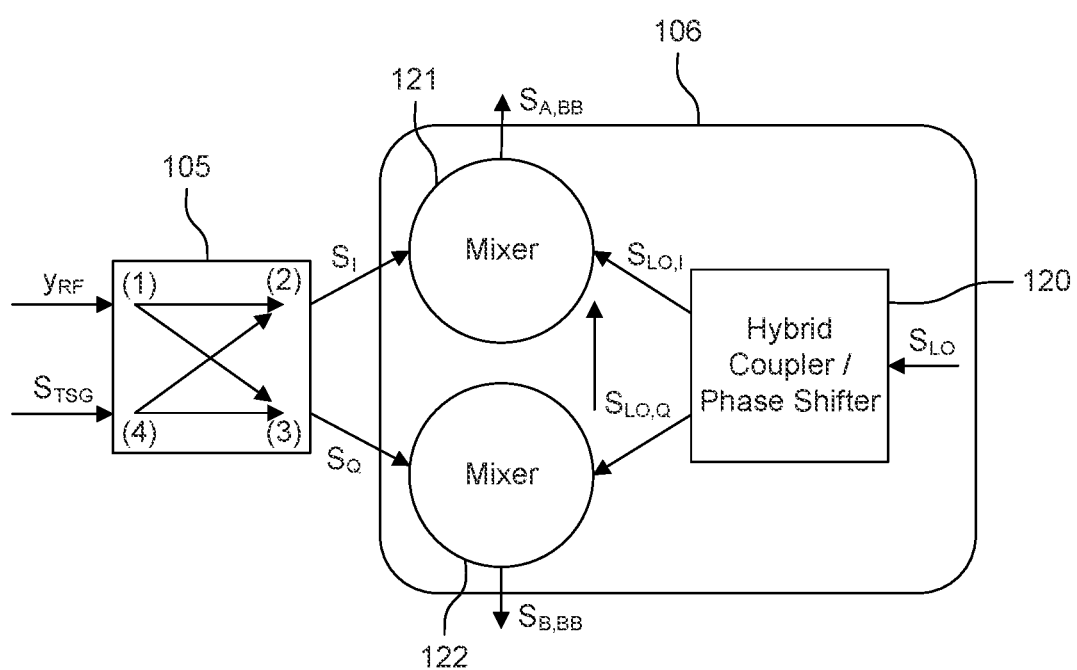
FIG. 5 is a schematic block diagram of a 90° hybrid coupler and a quadrature down-converter architecture of a MIMIC according to one or more embodiments.

FIG. 5 is a schematic block diagram of the 90° hybrid coupler 105 and the quadrature down-converter 106 of the MIMIC 100 according to one or more embodiments. The 90° hybrid coupler 105 receives the received signal $y_{RF}(t)$ at one of its input ports and the test signal $S_{TSG}(t)$ at its other input port and generates the first coupler output signal $S_I$ and the second coupler output signal $S_Q$ and its output ports. The first coupler output signal $S_I$ and the second coupler output signal $S_Q$ are provided to the quadrature down-converter 106, which performs a quadrature down-conversion of the two hybrid coupler outputs to baseband using the LO signal $S_{LO}(t)$.

The quadrature down-converter 106 includes a splitter 120 configured to receive the LO signal $S_{LO}(t)$ and generate a first reference signal $S_{LO,I}$ and a second reference signal $S_{LO,Q}$ based on the LO signal $S_{LO}(t)$, where the first and the second reference signals have a 90° phase difference relative to each other. The splitter 120 may be a 90° hybrid coupler 120 that receives the LO signal $S_{LO}(t)$ and equally divides the LO signal $S_{LO}(t)$ into reference signals $S_{LO,I}$ and $S_{LO,Q}$. In this case, the first reference signal $S_{LO,I}$ is an first signal component of the LO signal $S_{LO}(t)$ and the second reference signal $S_{LO,Q}$ is a second signal component of the LO signal $S_{LO}(t)$. However, the first reference signal and the second reference signal are interchangeable as long as their relative phase shift is 90 degrees and provided that the correct combination is considered in the combiner to achieve Equations (10) and (11). Alternatively, the splitter 120 may be phase shifter that equally divides the LO signal $S_{LO}(t)$ into two signals and applies a 90-degree phase shift to one of the split signals to generate the first and the second reference signals. Thus, the second reference signal $S_{LO,Q}$ could be output to mixer 121 and the first reference signal $S_{LO,I}$ could be output to mixer 122.

The quadrature down-converter 106 further includes a first mixer 121 and a second mixer 122. The first mixer 121 receives the first coupler output signal $S_I$ and the first reference signal $S_{LO,I}$, and uses the first reference signal $S_{LO,I}$ to down-convert the first coupler output signal $S_I$ into the baseband signal $S_{A,BB}$. The second mixer 122 receives the second coupler output signal $S_Q$ and the second reference signal $S_{LO,Q}$, and uses the second reference signal $S_{LO,Q}$ to down-convert the second coupler output signal $S_Q$ into the baseband signal $S_{B,BB}$.

The hardware architecture exploits a hybrid coupler and quadrature LO phases to implement a "mmW-switch" functionality with no impairments or no substantial impairments on RF performance, which takes into account imperfections that would be deemed common in the industry without departing from the aspects of the embodiments described herein. By properly combining the intermediate output signals (i.e., the BB signals), it is possible to ideally output either the RF input signal or the injected test/monitoring signal, thus significantly improving the robustness to interferences during monitoring and enabling antenna-diversity.

Figure 6:
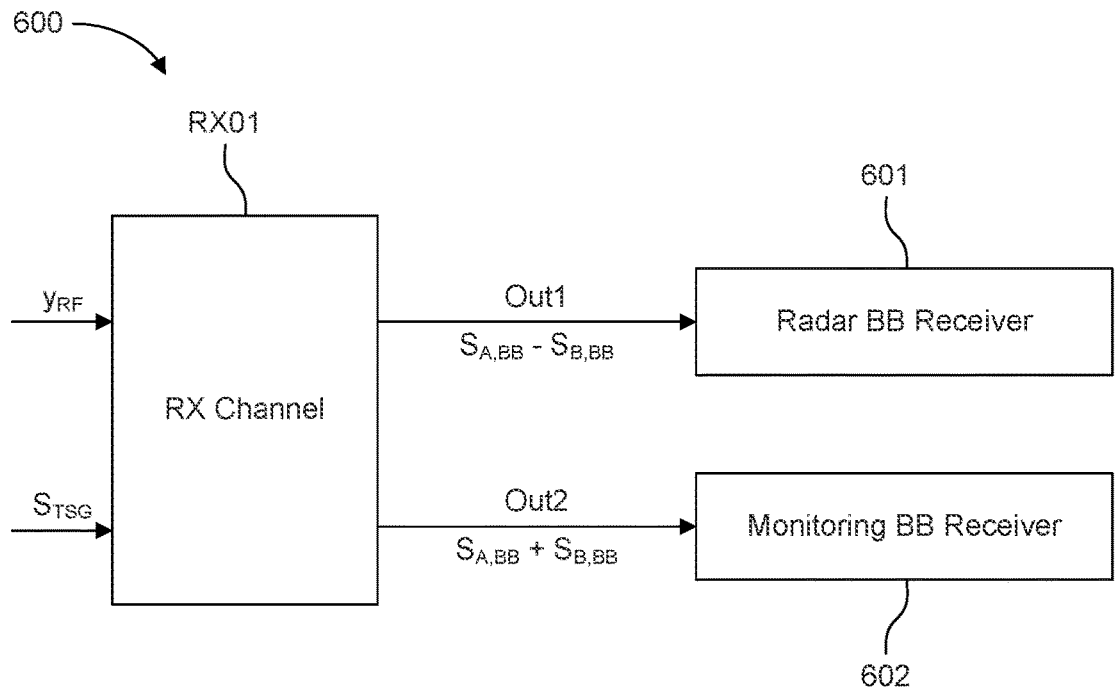
FIG. 6 is a schematic block diagram of a RX monitoring system according to one or more embodiments.

FIG. 6 is a schematic block diagram of a RX monitoring system 600 according to one or more embodiments. The RX monitoring system 600 incudes the RX channel RX01 of FIG. 4 that is configured to receive the received signal $y_{RF}(t)$ and the test signal $S_{TSG}(t)$ and output the output signals first output signal Out1 and second output signal Out2 either sequentially, using time-division multiplexing, or simultaneously in parallel. The RX monitoring system 600 includes two separate receiver baseband (BB) processing circuits, including radar BB receiver circuit 601 and monitoring BB receiver circuit 602.

The radar BB receiver circuit 601 receives the first output signal Out1 for radar data processing. The monitoring BB receiver circuit 602 receives the second output signal Out2 for monitoring data processing. For example, the monitoring BB receiver circuit 602 may calculate the phase difference between the first output signal Out1 and the LO signal $S_{LO}(t)$ and/or the test signal $S_{TSG}(t)$ for evaluating one or more properties/characteristics of the signal path of the RX channel RX01. As another example, the monitoring BB receiver circuit 602 may use algorithms to calculate a noise power level of Out2, either with or without $S_{TSG}(t)$ applied, to be able to assess if the noise performance of the RX channel RX01 is according to specifications. As another example, the monitoring BB receiver circuit 602 may use algorithms to calculate the power level of Out2 with $S_{TSG}(t)$ applied, to be able to assess if the "conversion gain" performance of the RX channel RX01 is according to specifications. As another example, the monitoring BB receiver circuit 602 may use algorithms to calculate the phase of the Out2 output with $S_{TSG}(t)$ applied, and compare it with the phase of other receivers to be able to assess if the "phase balance" performance of the RX channels is according to specifications.

This RX channel monitoring can be performed simultaneously while radar data is being received and processed by the radar BB receiver circuit 601 to enable monitoring in real-time while a radar operation is active. Radar data is received when the transmitter is active. Thus, the transmitter (i.e., the transmission channel TX01) may be configured to transmit (e.g., by setting the gain of amplifier 102) an RF transmit signal while monitoring is enabled (e.g., while the test signal is generated). In this way, the transmission channel TX01 is configured to generate and output an RF transmit signal $S_{RF}(t)$ such that the 90° hybrid coupler 105 receives the reception signal $y_{RF}(t)$ and the test signal $S_{TSG}(t)$ while the RF transmit signal $S_{RF}(t)$ is being transmitted. This enables the MIMIC 100 to simultaneously perform radar operations and monitoring operations in parallel. The advantage is that there is no time gap (e.g., blanking time) in radar data being received by the radar BB receiver circuit 601 (e.g., the DSP 40) when the RX channel is being tested and analyzed.

For an MMIC that includes multiple reception channels, each RX channel can have its own monitoring BB receiver circuit 602 or a single monitoring BB receiver circuit 602 may be shared among the RX channels in a time-domain multiplexed operation.

Figure 7A:
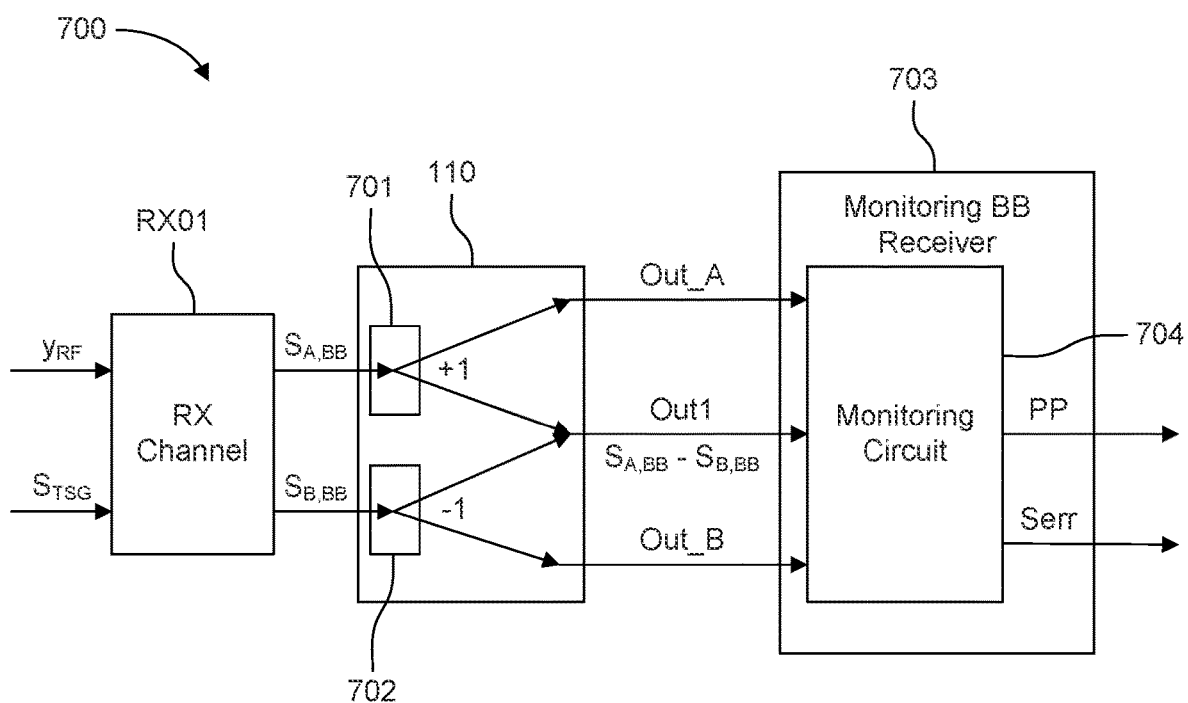
FIG. 7A is a schematic block diagram of a RX monitoring system according to one or more embodiments.

FIG. 7A is a schematic block diagram of a RX monitoring system 700 according to one or more embodiments. The RX monitoring system 700 includes a monitoring BB receiver 703 that includes a monitoring circuit 704. The monitoring BB receiver 703 may be used in combination with the radar BB receiver circuit 601 and the monitoring BB receiver circuit 602 shown in FIG. 6. The monitoring BB receiver 703 is configured to monitor a performance parameter PP, such a linearity value or a non-linearity value of the quadrature down-converter 106, or other performance parameter of the RX channel, by exploiting both the $S_{TSG}(t)$ and $y_{RF}(t)$ input signals. A performance parameter PP may be a linearity value, a non-linearity value, a spurious free dynamic range (SFDR) value, a second order intercept point (IIP2) value, a third order intercept point (IIP3) value, or the like.

In this example, the signal combiner 110 includes to power splitters 701 and 702 integrated therewith. Alternatively, the power splitters 701 and 702 may be external to the signal combiner 110. Splitter 701 is configured to split baseband signal $S_{A,BB}$ into a first portion and a second portion and splitter 702 is configured to split baseband signal $S_{B,BB}$ into a first portion and a second portion. The signal combiner 110 is configured to combine the first portion of baseband signal $S_{A,BB}$ and the first portion of baseband signal $S_{B,BB}$ via subtraction to generate the first output signal Out1. The signal combiner 110 outputs the first output signal Out1 to the monitoring BB receiver 703.

Additionally, splitter 701 provides the second portion of baseband signal $S_{A,BB}$ to the monitoring BB receiver 703 as output signal Out_A. Splitter 702 provides the second portion of baseband signal $S_{B,BB}$ to the monitoring BB receiver 703 as output signal Out_B. The monitoring circuit 704 receives the three output signals Out1, Out_A, and Out_B, and calculates a linearity value (or non-linearity value) of the quadrature down-converter 106 based on the three output signals.

One example is an IIP3 calculation with multi-tone testing. Consider FIG. 7A and assume that $S_{RF}(t)$ shows at least one very strong signal. It is possible to apply a second strong signal $S_{TSG}$ by using the test signal generator 104. According to Equations (8) and (9), both Out_A and Out_B ideally contain two strong signals, e.g., $(e^{j\omega_{IF}}) + je^{j\omega_{TSG}}$ for Out_A. In practice, due to limited linearity performance of the down-converter 106 and/or buffer 103, additional small intermodulation components will be present at Out_A and Out_B, each of which have a spectrum that resembles the spectrum shown in FIG. 7B, where we arbitrarily set frequency $\omega a$=frequency $\omega IF$ and frequency $\omega b$=frequency $\omega TSG$ and the intermodulation tones are at least $2\omega a - \omega b$ and $2\omega b - \omega a$. Power of the fundamental frequencies $\omega a$ and $\omega b$ is designated as Pout and the power of the third order products $2\omega a$ and $2\omega b$ is designated as Pout_3. The power level difference $\Delta P$ between fundamental and inter-modulation products is calculated as difference of Pout and Pout_3.

From this kind of output spectra, it is possible to estimate the IIP3 according to an IIP3 calculation formula, which uses the power of tones at frequencies $\omega a$, $\omega b$, $2\omega a - \omega b$, and $2\omega b - \omega a$ of the output spectra for the calculation.

On the other hand, in state-of-the-art receivers, it is very challenging and often impractical to feed strong levels of $S_{TSG}$ required to produce such spectrum due to at least four reasons:

(1) The noise introduced by $S_{TSG}$ would corrupt the radar output, so while this can be done during radar operation, radar data is not usable due to high noise;
(2) The noise introduced by the $S_{TSG}$ would mask the small intermodulation tones around $\omega b$ and $\omega a$, making the linearity measurement unreliable or impossible;
(3) The non-linearity introduced by the $S_{TSG}$ would corrupt the radar output as well; and
(4) The $S_{TSG}$ power required to produce measurable intermodulation tones cannot be reached.

The relative severity of these problems depends on the specific application, circuit architecture or technology used to implement the MMIC. Those issues prevent a two-tones test to be effectively performed during radar operation with previous art receivers.

With the RX architecture shown in FIG. 5, the radar output Out1 is free from all the imperfections introduced by an imperfect $S_{TSG}$, thus solving or substantially relaxing problems 1 and 3 listed above. Also, Out1 can provide an accurate estimate of the power at $\omega a$, e.g., using standard spectral estimation techniques.

Figure 7B:
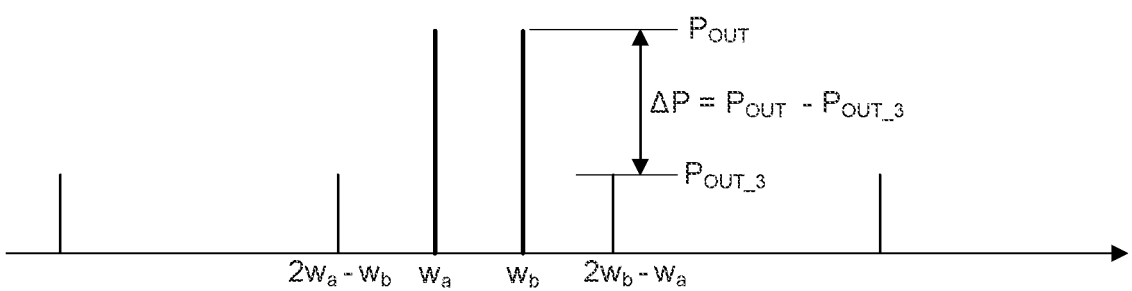
FIG. 7B illustrates a spectrum of a baseband signal output by a quadrature down-converter according to one or more embodiments.

Compared to previous or state-of-the-art receivers, the power of $S_{TSG}$ is not attenuated, hence high power levels can be reached, thus solving problem 4. Also, Out_A and Out_B, which show a spectra shown in FIG. 7B, provide an accurate estimate of power at $\omega b$, and of some of the inter-modulation products as well.

With respect to problem 2, the radar Out1 will also include many of the intermodulation tones produced by the circuit, $2\omega a - \omega b$ and $2\omega b - \omega a$, but being this output free from $S_{TSG}$ noise and nonlinearities, those components can be also accurately estimated, thus solving the problem.

In conclusion, by combining Out_A, Out_B and Out1 information, the non-linear products generated by the two strong tones can be recognized, and the main tones as well, and therefore the IIP3 (or other metrics) due to downconverter 106 and/or buffer 103 can be estimated. At the same time, Out1 provides the radar-signal without the big noise and non-linearity impairments due to $S_{TSG}$, except for the small intermodulation tones 2ωa-ωb and 2ωb-ωa. Those small components appear at predictable frequencies and only while $S_{TSG}$ is active (it is typically not needed to have continuous monitoring), so there is no risk to misunderstand them as ghost targets. The monitoring circuit 704 can then compare the linearity value to a threshold value, and detect an error on a condition that the linearity value exceeds the threshold. For example, if the linearity value exceeds the threshold, the monitoring circuit 704 may determine that the quadrature down-converter 106 is not operating properly (i.e., as expected) and generate an error signal Serr in response to detecting this error. In other words, if the linearity value exceeds the threshold, a non-linearity condition may be present at the quadrature down-converter 106 where the two mixers 121 and 122 are no longer operating in linearity with each other. The monitoring circuit 704 may be configured to output the performance parameter PP as well.

The monitoring circuit 704 may also calculate another performance parameter PP of the quadrature down-converter 106, such as a key performance indicator (KPI), based on two or all three of the output signals Out1, Out_A, Out_B. For example, the monitoring circuit 704 may use at least output signal Out_A and output signal Out_B to calculate the performance parameter of the quadrature down-converter 106. The monitoring circuit 704 may compare the performance parameter PP to a threshold, and detect an error on a condition that the performance parameter PP exceeds the threshold (i.e., is less than or is greater than the threshold). The monitoring circuit 704 may generate an error signal Serr in response to detecting this error, where the error signal Serr identifies the type of error corresponding to the performance parameter PP.

Additionally, the monitoring circuit 704 may be configured to calculate a performance parameter PP of the RF signal path based on two or all three of the output signals Out1, Out_A, Out_B. The performance parameter PP of the RF signal path may be related to any component or combination of components arranged on the RF signal path, including SFDR, IIP2, IIP3, etc. The monitoring circuit 704 may compare the performance parameter PP to a threshold, and detect an error on a condition that the performance parameter PP exceeds the threshold (i.e., is less than or is greater than the threshold). The monitoring circuit 704 may generate an error signal Serr in response to detecting this error, where the error signal Serr identifies the type of error corresponding to the type of performance parameter PP.

FIG. 8 illustrates another exemplary implementation of the RF frontend 10 and the baseband signal processing chain 20 of a radar MIMIC according to one or more embodiments. In this case, the RF frontend 10 includes a second reception antenna 6' that receives a second reception RF signal $y_{RF}(t)'$. An optional RF amplifier 103 (gain g) may be provided to generate an amplified RF signal $g \cdot y_{RF}(t)'$. In this embodiment, the 90° hybrid coupler 105 receives the two reception RF signals $y_{RF}(t)$ and $y_{RF}(t)'$ and generates the first coupler output signal $S_I$ and the second coupler output signal $S_Q$ therefrom, in a similar manner described above with respect to FIGS. 4 and 5. The quadrature down-converter 106 then down-converts the signals $S_I$ and $S_Q$ into respective baseband signals $S_{A,BB}$ and $S_{B,BB}$ using the LO signal $S_{LO}(t)$ as described above. The signal combiner 101 combines the baseband signals $S_{A,BB}$ and $S_{B,BB}$ to generate either a first output signal Out1 ($S_{A,BB}-S_{B,BB}$) or a second output signal Out2 ($S_{A,BB}+S_{B,BB}$).

The first output signal Out1 ($S_{A,BB}-S_{B,BB}$) is free of signal components originating from the second received RF signal $y_{RF}(t)'$. Thus, the first output signal Out1 ($S_{A,BB}-S_{B,BB}$) is sensitive to the first received RF signal $y_{RF}(t)$, while being insensitive or substantially insensitive to the second received RF signal $y_{RF}(t)'$. In other words, the first output signal Out1 is dependent on the characteristics of the received RF signal $y_{RF}(t)$ and is independent of the second receive RF signal $y_{RF}(t)'$. It is noted that according to equation (10), the first output signal Out1 is in-phase with the received signal $y_{RF}(t)$.

The second first output signal Out2 ($S_{A,BB}+S_{B,BB}$) is free of signal components originating from the first received RF signal $y_{RF}(t)$. Thus, the second output signal Out2 ($S_{A,BB}+S_{B,BB}$) is sensitive to the second received RF signal $y_{RF}(t)'$, while being insensitive or substantially insensitive to the first receive signal $y_{RF}(t)$. In other words, the second output signal is dependent on the characteristics of the second received signal $y_{RF}(t)'$ and is independent of the first receive signal $y_{RF}(t)$. It is noted that according to equation (11), the second output signal Out2 is quadrature with the second received RF signal $y_{RF}(t)'$ (i.e., it is phase shifted 90 degrees from the second received RF signal $y_{RF}(t)'$).

The RF circuit shown in FIG. 8 includes: a first input configured to receive a first RF signal $y_{RF}(t)$ from a first antenna 6; a second input configured to receive a second RF signal $y_{RF}(t)'$ from a second antenna 6'; at least one output terminal configured to output at least one of a first output signal Out1 corresponding to the first RF signal $y_{RF}(t)$ or a second output signal Out2 corresponding to the second RF signal $y_{RF}(t)'$; a 90° hybrid coupler 105 configured to receive, in parallel, the first RF signal $y_{RF}(t)$ and the second RF signal $y_{RF}(t)'$, generate a first coupler output signal $S_I$ based on the first RF signal and the second RF signal, generate a second coupler output signal $S_Q$ signal based on the first RF signal and the second RF signal, and output, in parallel, the first coupler output signal $S_I$ and the second coupler output signal $S_Q$; a quadrature down-converter 106 configured to down-convert the first coupler output signal into a first baseband signal $S_{A,BB}$ and down-convert the second coupler output signal into a second baseband signal $S_{B,BB}$; and a baseband combiner circuit 110 configured to combine the first baseband signal $S_{A,BB}$ and the second baseband signal $S_{B,BB}$ to generate the first output signal Out1 and/or the second output signal Out2.

Accordingly, the architecture shown in FIG. 8 allows two reception antennas to share a single RX channel and implement a "mmW-switch" functionality with no or substantially no impairments on RF performance on either received signal. By properly combining the intermediate output signals (i.e., the BB signals), it is possible to ideally output either the first RF input signal from a first reception antenna or the second RF input signal from a second reception antenna without interference form the other input signal, thus significantly improving the robustness to interferences during reception and enabling antenna-diversity.

Antenna diversity is the ability to use one single front-end signal path to handle two different RF (e.g., mmW) inputs in a time-domain multiplexed manner. The mode select control signal Sselect enables the system controller 50 to switch among two different RF inputs while using the same receiver front-end receiver path. In other words, while both reception antennas 6 and 6' are active (and thereby connected to the RX channel), the system controller 50 can select which reception antenna is in use for a radar operation by selectively combining the two baseband signals $S_{A,BB}$ and $S_{B,BB}$ in a way that is sensitive only to the selected antenna (i.e., the combined signal is sensitive only to its corresponding RF receive signal).

While various embodiments have been described, it will be apparent to those of ordinary skill in the art that many more embodiments and implementations are possible within the scope of the disclosure. Accordingly, the invention is not to be restricted except in light of the attached claims and their equivalents. With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

Instructions may be executed by one or more processors, such as one or more central processing units (CPUs), digital signal processors (DSPs), general purpose microprocessors, application specific integrated circuits (ASICs), field programmable logic arrays (FPGAs), or other equivalent integrated or discrete logic circuitry. Accordingly, the term "processor" or "processing circuitry" as used herein refers to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

Thus, the techniques described in this disclosure may be implemented, at least in part, in hardware, software, firmware, or any combination thereof. For example, various aspects of the described techniques may be implemented within one or more processors, including one or more microprocessors, DSPs, ASICs, or any other equivalent integrated or discrete logic circuitry, as well as any combinations of such components.

A controller including hardware may also perform one or more of the techniques described in this disclosure. Such hardware, software, and firmware may be implemented within the same device or within separate devices to support the various techniques described in this disclosure. Software may be stored on a non-transitory computer-readable medium such that the non-transitory computer readable medium includes a program code or a program algorithm stored thereon which, when executed, causes the controller, via a computer program, to perform the steps of a method.

Although various exemplary embodiments have been disclosed, it will be apparent to those skilled in the art that various changes and modifications can be made which will achieve some of the advantages of the concepts disclosed herein without departing from the spirit and scope of the invention. It will be obvious to those reasonably skilled in the art that other components performing the same functions may be suitably substituted. It is to be understood that other embodiments may be utilized, and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

What is claimed is:

1. A radio frequency (RF) circuit, comprising:
   a first RF input configured to receive a first RF signal from a first antenna;
   a second RF input configured to receive a second RF signal synthesized from a same reference clock as the first RF signal;
   a first 90° hybrid coupler, comprising a first port and a second port, configured to:
      receive the first RF signal at the first port and the second RF signal at the second port,
      generate a first coupler output signal based on the first RF signal and the second RF signal, and
      generate a second coupler output signal based on the first RF signal and the second RF signal;
   a quadrature down-converter comprising:
      a splitter configured to:
         receive a reference signal, and
         generate a first reference signal and a second reference signal based on the reference signal, wherein the first reference signal and the second reference signal have a 90° phase difference relative to each other,
      a first mixer configured to:
         receive the first coupler output signal and the first reference signal, and
         down-convert the first coupler output signal into a first baseband signal using the first reference signal, and
      a second mixer configured to:
         receive the second coupler output signal and the second reference signal, and
         down-convert the second coupler output signal into a second baseband signal using the second reference signal; and a baseband combiner circuit configured to combine the first baseband signal and the second baseband signal to generate at least one of a first output signal or a second output signal.

2. The RF circuit of claim 1, wherein:
the first coupler output signal includes a first component of the first RF signal and a first component of the second RF signal,
the second coupler output signal includes a second component of the first RF signal and a second component of the second RF signal,
the second component of the first RF signal is 90° phase shifted from the first component of the first RF signal by the first 90° hybrid coupler, and
the first component of the second RF signal is 90° phase shifted from the second component of the second RF signal by the first 90° hybrid coupler.

3. The RF circuit of claim 1, wherein the baseband combiner circuit is further configured to:
subtract the first baseband signal and the second baseband signal to generate the first output signal, and
add the first baseband signal and the second baseband signal to generate the second output signal.

4. The RF circuit of claim 3, wherein the baseband combiner circuit is further configured to;
receive a mode select signal, and
generate either the first output signal or the second output signal based on the mode select signal.

5. The RF circuit of claim 1, wherein:
the first output signal is sensitive to the first RF signal and insensitive to the second RF signal, and
the second output signal is sensitive to the second RF signal and insensitive to the first RF signal.

6. The RF circuit of claim 1, wherein:
the first output signal is free of signal components originating from the second RF signal, and
the second output signal is free of signal components originating from the first RF signal.

7. The RF circuit of claim 1, further comprising:
a local oscillator configured to generate the reference signal.

8. The RF circuit of claim 7, further comprising:
a transmission channel configured to generate and output RF transmission signals based on the reference signal.

9. The RF circuit of claim 1, further comprising:
a first analog-to-digital converter (ADC) configured to convert the first baseband signal into a digital first baseband signal; and
a second ADC configured to convert the second baseband signal into a digital second baseband signal,
wherein the baseband combiner circuit is further configured to combine the digital first baseband signal and the digital second baseband signal to generate the at least one of the first output signal or the second output signal.

10. The RF circuit of claim 1, wherein the baseband combiner circuit is a programmable baseband signal combiner configured to:
receive a mode select signal; and
generate, based on the mode select signal, the first output signal, as a first linear combination of the first baseband signal and the second baseband signal, or the second output signal, as a second linear combination of the first baseband signal and the second baseband signal, wherein the second linear combination is different from the first linear combination.

11. The RF circuit of claim 1, further comprising:
a test signal generator coupled to the first 90° hybrid coupler and configured to output the second RF signal.

12. The RF circuit of claim 1, wherein the second RF input is configured to receive the second RF signal from a second antenna.

13. The RF circuit of claim 1, further comprising:
a transmission channel configured generate and output an RF transmit signal,
wherein the first 90° hybrid coupler is further configured to receive the first RF signal and the second RF signal while the RF transmit signal is being transmitted.

14. The RF circuit of claim 1, wherein the baseband combiner circuit is further configured to simultaneously generate the first output signal and the second output signal, wherein the first output signal is generated as a first linear combination of the first baseband signal and the second baseband signal, and wherein the second output signal is generated as a second linear combination of the first baseband signal and the second baseband signal, wherein the second linear combination is different from the first linear combination.

15. The RF circuit of claim 14, further comprising:
a baseband processing circuit configured to process the first output signal; and
a monitoring circuit configured to process the second output signal.

16. The RF circuit of claim 15, further comprising:
a transmission channel configured to generate and output an RF transmit signal,
wherein the first 90° hybrid coupler is configured to receive the first RF signal and the second RF signal while the RF transmit signal is being transmitted.

17. The RF circuit of claim 1, further comprising:
a non-linearity monitoring circuit configured to:
receive at least a portion of the first baseband signal and at least a portion of the second baseband signal,
calculate a performance parameter of the quadrature down-converter based on the at least a portion of the first baseband signal and the at least a portion of the second baseband signal,
compare the performance parameter to a threshold, and
detect an error on a condition that the performance parameter exceeds the threshold.

18. The RF circuit of claim 1, further comprising:
a monitoring circuit configured to:
receive at least a portion of the first baseband signal and at least a portion of the second baseband signal,
calculate a linearity value of the quadrature down-converter based on the at least a portion of the first baseband signal and the at least a portion of the second baseband signal,
compare the linearity value to a threshold, and
detect an error on a condition that the linearity value exceeds the threshold.

19. The RF circuit of claim 1, further comprising:
a monitoring circuit configured to:
receive at least a portion of the first baseband signal and at least a portion of the second baseband signal, and
calculate a parameter of a signal path between the first RF input and the second RF input based on the at least a portion of the first baseband signal and the at least a portion of the second baseband signal.

20. The RF circuit of claim 1, further comprising:
a first splitter configured to split the first baseband signal into a first portion and a second portion;

a second splitter configured to split the second baseband signal into a first portion and a second portion,
wherein the baseband combiner circuit is further configured to combine the first portion of the first baseband signal and the first portion of the second baseband signal to generate the at least one of the first output signal and the second output signal; and
a monitoring circuit configured to:
receive the second portion of the first baseband signal and the second portion of the second baseband signal, and
calculate a parameter of a signal path between the first RF input and the second RF input based on the second portion of the first baseband signal and the second portion of the second baseband signal.

21. The RF circuit of claim 20, further comprising:
a transmission channel configured generate and output an RF transmit signal,
the first 90° hybrid coupler is further configured to receive the first RF signal and the second RF signal while the RF transmit signal is being transmitted.

22. The RF circuit of claim 1, wherein:
the first 90° hybrid coupler comprises a third port and a fourth port, and
the first 90° hybrid coupler is further configured to:
simultaneously generate the first coupler output signal and the second coupler output signal,
output the first coupler output signal at the third port, and
output the second coupler output signal at the fourth port.

23. The RF circuit of claim 1, wherein the first 90° hybrid coupler comprises an input port and an isolated port, wherein the input port is the first port and the isolated port is the second port.

24. The RF circuit of claim 1, further comprising:
a first splitter configured to split the first baseband signal into a first portion and a second portion;
a second splitter configured to split the second baseband signal into a first portion and a second portion,
wherein the baseband combiner circuit is further configured to combine the first portion of the first baseband signal and the first portion of the second baseband signal to generate the first output signal; and
a monitoring circuit configured to:
receive the second portion of the first baseband signal, the second portion of the second baseband signal, and the first output signal, and
calculate a parameter of a signal path between the first RF input and the second RF input based on the second portion of the first baseband signal, the second portion of the second baseband signal, and the first output signal.

25. A method comprising:
receiving, by a first radio frequency (RF) input, a first RF signal;
receiving, by a second RF input, a second RF signal;
generating, by a 90° hybrid coupler, a first coupler output signal based on the first RF signal and the second RF signal;
generating, by the 90° hybrid coupler, a second coupler output signal based on the first RF signal and the second RF signal,
wherein the second RF signal is synthesized from a same reference clock as the first RF signal;
down-converting, by a quadrature down-converter, the first coupler output signal into a first baseband signal;
down-converting, by the quadrature down-converter, the second coupler output signal into a second baseband signal;
splitting, by a first splitter, a first baseband signal into a first portion and a second portion;
splitting, by a second splitter, a second baseband signal into a first portion and a second portion;
combining, by a baseband combiner circuit, the first portion of the first baseband signal and the first portion of the second baseband signal to generate at least one of a first output signal representative of the first RF signal and a second output signal representative of the second RF signal;
receiving, by a monitoring circuit, the second portion of the first baseband signal and the second portion of the second baseband signal; and
calculating a parameter of a signal path between the first RF input and the second RF input based on the second portion of the first baseband signal and the second portion of the second baseband signal.

26. A method, comprising:
receiving a first radio frequency (RF) signal, at a first RF input, and a second RF signal at a second RF input
receiving the first RF signal, at a first port of a 90° hybrid coupler, and the second RF signal at a second port of the 90° hybrid coupler;
simultaneously generating, by the 90° hybrid coupler, a first coupler output signal, based on the first RF signal and the second RF signal, and a second coupler output signal based on the first RF signal and the second RF signal;
outputting the first coupler output signal, at a third port of the 90° hybrid coupler, and the second coupler output signal at a fourth port of the 90° hybrid coupler;
receiving, by a quadrature down-converter, the first coupler output signal and the second coupler output signal;
down-converting the first coupler output signal, into a first baseband signal, and the second coupler output signal into a second baseband signal; and
combining the first baseband signal and the second baseband signal to generate at least one of a first output signal or a second output signal.

27. The method of claim 26, wherein combining the first baseband signal and the second baseband signal comprises at least one of:
subtracting the first baseband signal and the second baseband signal to generate the first output signal, or
adding the first baseband signal and the second baseband signal to generate the second output signal.

28. The method of claim 26, wherein combining the first baseband signal and the second baseband signal comprises:
receiving a mode select signal, and
generating either the first output signal or the second output signal based on the mode select signal.

* * * * *